E. NEELY.
ELASTIC WHEEL.
APPLICATION FILED DEC. 26, 1917. RENEWED JAN. 19, 1921.
1,388,289.
Patented Aug. 23, 1921.
2 SHEETS—SHEET 1.
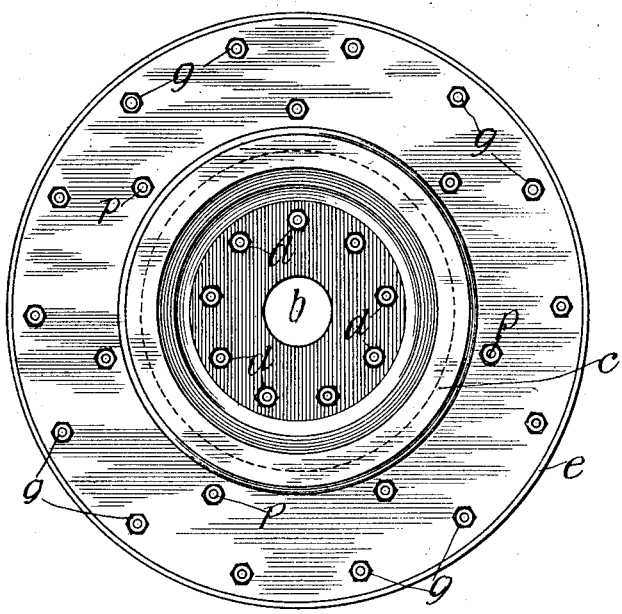
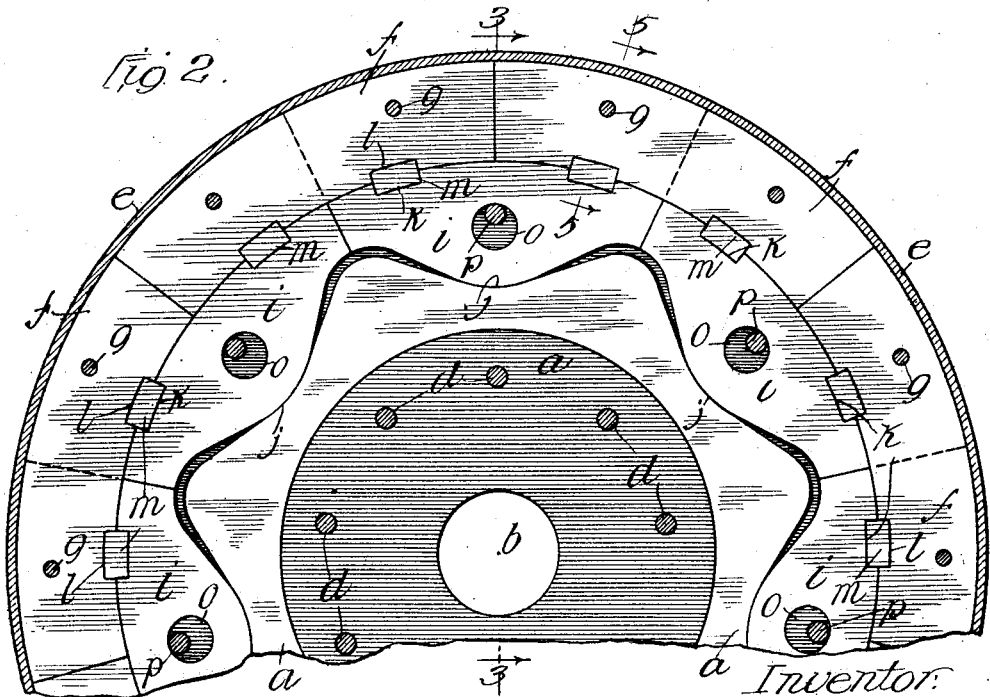
Witnesses:
Harry R. L. White
W. F. Kilroy
Inventor:
Edward Neely
By John Howard Miller
his Atty.

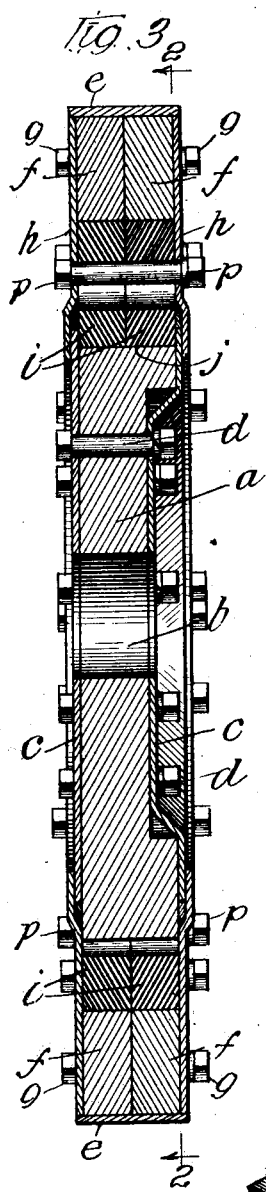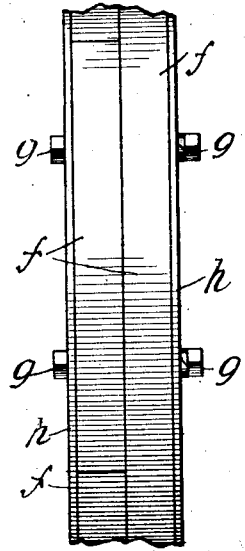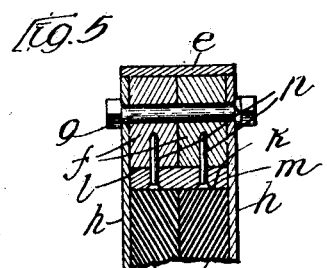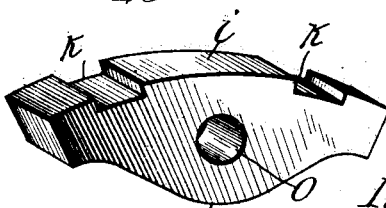

UNITED STATES PATENT OFFICE.

EDWARD NEELY, OF CHICAGO, ILLINOIS.

ELASTIC WHEEL.

1,388,289.

Specification of Letters Patent.

Patented Aug. 23, 1921.

Application filed December 26, 1917, Serial No. 208,899. Renewed January 19, 1921. Serial No. 438,524.

*To all whom it may concern:*

Be it known that I, EDWARD NEELY, a citizen of the United States, and a resident of Chicago, in the county of Cook and State of Illinois, have invented certain new and useful Improvements in Elastic Wheels, of which the following is a full, clear, and exact specification.

My invention is concerned with elastic wheels of the type in which cushion driving connections are interposed between the hub portion and the rim portion, and is designed to produce a wheel of the class described in which the amount of the engaged driving surface in the lower half of the wheel varies automatically with the load on the wheel, thus making a wheel in which the elasticity is always properly proportioned to the load thereon.

Such wheels are mainly employed for trucks and motor vehicles that carry heavy loads, and as heretofore constructed these wheels have had the cushion connections constructed so that there was no substantial variation in their cushioning action when used on light or heavy loads. As a result, when the trucks were heavily loaded on the delivery half of a trip, the load was properly cushioned, but when it returned empty or lightly loaded, and desirably at a greater speed, the cushion action was too stiff, so to speak, so that the truck would be unnecessarily shaken up. It would be like an automobile with strongly inflated pneumatic tires, which rides easily and smoothly with a heavy load, but which with a light load would bound over the road and jar up the machine and the occupants unnecessarily.

With my invention, the cushioning connection is automatically properly proportioned to the load, and an automobile mounted on wheels containing my invention will ride as easily with light loads as with heavy loads, it acting as if the wheels were pneumatic and strongly inflated for heavy loads and less strongly for light loads.

To illustrate my invention, I annex hereto two sheets of drawings in which the same reference characters are used to designate identical parts in all the figures of which Figure 1 is a side elevation of the body of a wheel containing my invention;

Fig. 2 is a side elevation of the same on an enlarged scale as seen in section on the line 2—2 of Fig. 3;

Fig. 3 is a central vertical section as seen on the line 3—3 of Fig. 2;

Fig. 4 is a top plan view of a portion of the wheel with the felly band removed;

Fig. 5 is a detail in section on the line 5—5 of Fig. 2, and

Fig. 6 is a perspective view of one of the rubber cushioning blocks.

The basis of the hub member is a wooden annulus $a$, which has a central aperture $b$ therein in which can be placed any desired form of a hub proper. The periphery of the annulus $a$ is, as seen in Fig. 2, waived or serpentine in its outline, having a regular series of elevations and depressions. On each side is secured an annular metallic plate $c$, the central wooden annulus and the two metallic annuli being all suitably clamped together by the series of bolts $d$ passed therethrough.

The rim annulus consists of the customary metallic felly band $e$ within which is placed a number of segmental felly pieces $f$, which are preferably formed of wood and which preferably are made in two overlapping layers which break joints, as shown, and are secured in place by the series of bolts $g$ passing through said felly pieces and through the annular metallic cover plates $h$, which overlap the annular plates of the hub member.

The cushion and driving connections are furnished by a plurality of rubber blocks $i$, seen in side elevation in Fig. 2 and in perspective in Fig. 6, which blocks are preferably arranged in pairs, but do not break joints. The inner faces $j$ of these blocks are curved, as shown, so that when the blocks are placed end to end against the felly pieces $f$, they make what is practically a continuous annulus having its inner surface waved or serpentined so as to coöperate with the correspondingly waived or serpentined periphery of the hub member $a$. To secure these blocks $i$ in place, I form on their outer faces the pair of rectangular recesses $k$, and form similar recesses $l$ in the felly blocks, and when the felly blocks are assembled, I drive into each of the registering pairs of recesses $l$ a wooden block $m$, which is then secured in place by driving through it and into the felly piece $f$ a pair of nails $n$. To secure the blocks $i$ from moving inward I pass through apertures $o$ in the center thereof bolts $p$, which are also passed through the annular plates *h* and serve also to strengthen the rim member. In order to make the blocks *i* somewhat more elastic, I make the apertures *o* of considerably greater diameter than is necessary to receive the bolts *p* which engage the outer edges of said apertures.

Instead of having the waved or serpentine surface formed by the plurality of blocks *i* of precisely the same contour as the coöperating waived surface of the hub member *a*, which would make the cushion action substantially the same for all loads, as seen in Fig. 2, I make the curved inner faces *j* of the blocks curve away from the corresponding hollows of the periphery of the hub member *a*, so that if the wheel could be considered as having no load at all, the blocks *j* and the hub member *a* would engage only at the thickest point of the blocks *j* and at the lowest portions of the periphery of the hub member *a*, and gradually separate more and more until they are separated the farthest at the highest points of the periphery of the hub member *a* and at the narrowest parts of the blocks *i*. It will be obvious, however, that the wheel always carries some weight, if nothing more than that of the vehicle supported thereby, and under such conditions, the hub member drops, as it were, from the central position, and the projections of the lower half of the periphery of the hub member *a* sink more deeply into the corresponding depressions in the lower half of the wheel formed at the meeting ends of the blocks *i*, thus increasing the frictional driving surface between the hub member and the rim member, and also reducing somewhat the resiliency of the wheel. When heavily loaded, the hub member sinks still lower, as it were, until the elevations of the periphery of the hub member *a* substantially completely fill the depressions in the lower half of the wheel formed by the reduced meeting ends of the blocks *i*, thus furnishing the greatest possible frictional driving surface and reducing the elasticity of the wheel to the lowest point. With this arrangement, it will be obvious that the heavy load will ride smothly because of the rubber blocks being strongly compressed and thus corresponding to the strongly inflated pneumatic tire, and when the load is materially lightened the compression of the blocks in the lower half is released, thus causing the load to ride more easily on account of the rubber blocks being less compressed. If it is desired to make the wheels still softer for very light loads, the alternate blocks *i* may be omitted.

While I have shown and described my invention as embodied in the form which I at present consider best to carry out its purpose, it will be understood that it is capable of some modifications, and I do not desire to be limited in the interpretation of the following claims except as may be necessitated by the state of the prior art.

What I claim as new and desire to secure by Letters Patent of the United States is:

1. In an elastic wheel, the combination with a rigid hub annulus, of a rigid rim annulus surrounding the same, one of said annuli having its periphery adjacent the other waved in its outline, and a rubber cushion annulus secured to the annulus that is opposed to the waved periphery of the other and having a coöperating waved periphery normally separated from the opposed waved periphery at the alternating crests and hollows of the waves.

2. In an elastic wheel, the combination with a rigid hub annulus, of a rigid rim annulus surrounding the same, one of said annuli having its periphery adjacent the other waved in its outline, and a rubber cushion annulus secured to the annulus that is opposed to the waved periphery of the other and having a coöperating waved periphery, said waved peripheries coöperating to furnish a driving connection between the annuli that shall have its driving contact surface automatically increased in the lower half of the wheel as the load thereon increase, and vice versa.

3. In an elastic wheel, the combination with a rigid hub annulus having an external annular channel, of an overlapping rigid rim annulus having an internal annular channel one of said channels having a waved bottom, a rubber annulus secured in the other channel made up of sections adapted to fit in the channel and having central apertures therein, the inner faces of the combined surfaces forming a waved periphery to coöperate with the waved bottom of the coacting channel, and means for holding the rubber sections securely in place.

4. In an elastic wheel, the combination with a rigid hub annulus having an external annular channel, of an overlapping rigid rim annulus having an internal annular channel, one of said channels having a waved bottom, a rubber annulus secured in the other channel made up of sections adapted to fit in the channel and having central apertures therein, the inner faces of the combined surfaces forming a waved periphery to coöperate with the waved bottom of the coacting channel, and means for holding the rubber sections securely in place, said means consisting of transverse blocks coöperating with recesses in the felly sections and the rubber sections to secure them all rigidly relatively to each other.

In witness whereof, I have hereunto set my hand and affixed my seal, this 17th day of December, A. D. 1917.

EDWARD NEELY. [L. S.]

Witness:
JOHN HOWARD McELROY.